United States Patent [19]

Goto

[11] Patent Number: 5,428,463
[45] Date of Patent: Jun. 27, 1995

[54] PICTURE IMAGE PHOTGRAPHING APPARATUS

[75] Inventor: Hiroshige Goto, Yokohama, Japan

[73] Assignee: Kabushiki Kaisha Toshiba, Kawasaki, Japan

[21] Appl. No.: 883,455

[22] Filed: May 15, 1992

[30] Foreign Application Priority Data

May 15, 1991 [JP] Japan ................... 4-110520

[51] Int. Cl.6 .............................................. H04N 1/04
[52] U.S. Cl. ...................................... 358/482; 358/474; 358/471; 348/619
[58] Field of Search ............... 358/482, 483, 474, 480, 358/471, 463, 447, 451, 443, 471, 167, 166, 213.15, 213.16, 461, 464, 445, 496, 448; 250/208.1; 382/54, 50; 348/619, 262, 265, 246, 247, 294

[56] References Cited

U.S. PATENT DOCUMENTS

| | | | |
|---|---|---|---|
| 4,724,489 | 2/1988 | Oldershaw | 358/447 |
| 4,844,288 | 7/1989 | Cho | 358/447 |
| 5,202,756 | 4/1993 | Sakaki et al. | 358/41 |
| 5,216,521 | 6/1993 | Birgmeir | 358/447 |

Primary Examiner—Edward L. Coles, Sr.
Assistant Examiner—Fan Lee
Attorney, Agent, or Firm—Foley & Lardner

[57] ABSTRACT

A picture image photographing apparatus is comprised of a lens system for imaging data on an original paper, a plurality of line sensors for inputting optical data imaged by the lens system and each comprised of a plurality of imaging elements for converting the optical signals on the line sensors into electrical signals, a plurality of output portions for outputting data signals which are converted from the electrical signals and have a predetermined voltage, and a signal processing portion for outputting a mean value as a final information with respect to a same portion of a same line on the paper, which is obtained from a plurality of the data signals supplied from the output portions. By the above components, it is possible to perform a high-speed processing for the read-out image and to extremely improve a signal to noise (SN) ratio due to optical shot noise.

20 Claims, 6 Drawing Sheets

PICTURE IMAGE PHOTGRAPHING APPARATUS

BACKGROUND OF THE INVENTION

The present invention relates to a picture image photographing apparatus using a solid-state imaging device, and more particularly, to an improved apparatus for preventing a picture image from deteriorating due to optical shot noise occurring in a solid-state imaging device.

Figure 1:
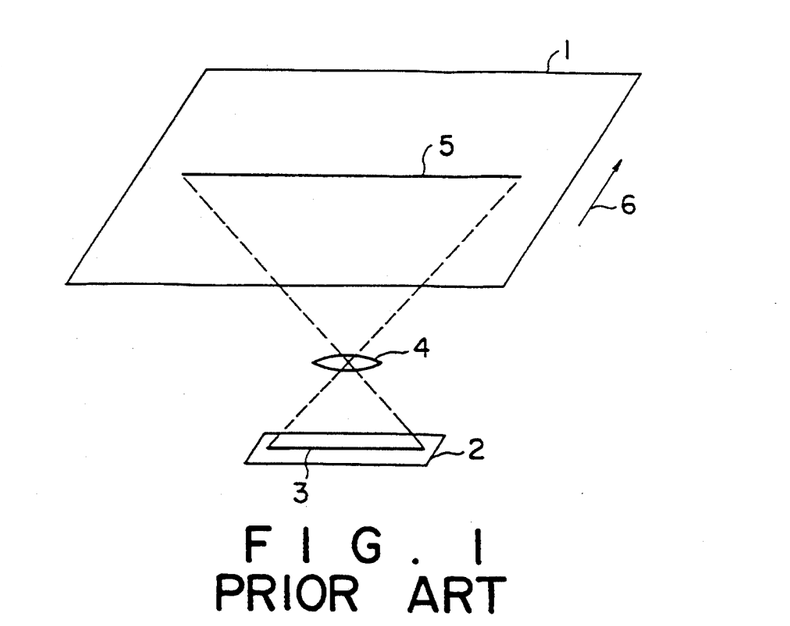
FIG. 1 is a block diagram showing a construction of a conventional picture image photographing apparatus.
Figure 2:
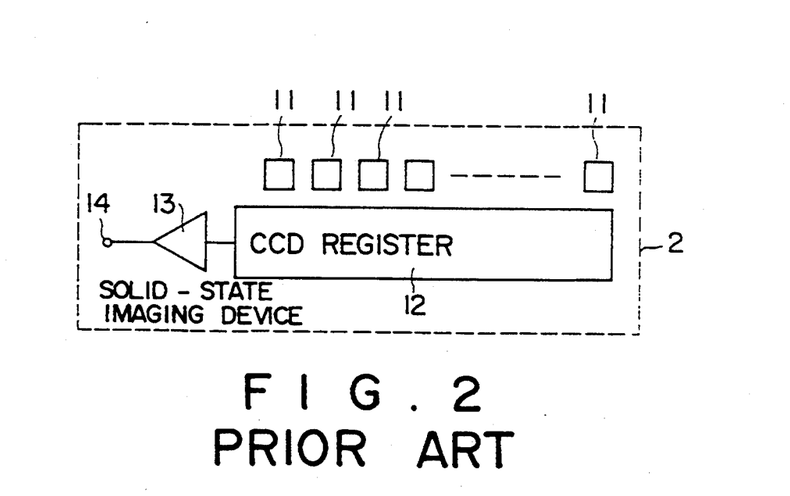
FIG. 2 is a block diagram showing a solid-state imaging device which is used as an input portion of the conventional picture image photographing apparatus as shown in FIG. 1.

In recent years, there has been extreme improvements in solid-state imaging devices and picture image photographing apparatus which uses solid-state imaging devices as an input portion which can perform high-speed scanning of an image having a high resolution. Solid-state imaging devices applied to picture image photographing apparatus, are classified into the projection type using a reduction optical system, and the contact type using a rod-lens system. The most realistic apparatus to realize high resolution scanning, such as over 600 DPI (dots per inch) scanning, is those that adopt projection type sensors, and this is, at present, due to the limitation of the resolution of optical systems. There is shown in FIG. 1 a conventional picture image photographing apparatus using such a reduction optical system. In FIG. 1, the conventional apparatus comprises a solid-state imaging device 2 having a line sensor 3, and an imaging lens 4 for projecting on the line sensor 3 a picture image of a line 5 on a paper 1 to be photographed. Then, as shown in FIG. 2, every imaging element 11 of the solid-state imaging element changes the picture image into signal charges corresponding to the quantity of light, and a CCD (charge coupled device) register 12 reads out the signal charges. The read-out signal charges are then converted into a voltage by an output buffer 13 to output outside the device 2 through an output terminal 14. It is possible to read information on the paper 1 by scanning in the direction of an arrow 6 to the paper 1.

The conventional image photographing apparatus, as described above, has the problems of the deterioration of signal-noise ratio caused by optical shot noise, especially when the apparatus is improved to be actuated for high speed and high resolution. It is well, known that a number of electrons which are read from a imaging element may be represented by a normal distribution of a standard deviation $(N_{av})^{\frac{1}{2}}$ when the average number of electrons contained in the charge pocket is $N_{av}$. Furthermore, $N_{av}$ may be described as follows:

$$N_{av} = A \times S \times T \times I,$$

where A denotes a constant, S denotes an area of the imaging element, T denotes a time for reading informations of one line (integration time), and I denotes a quantity of the light incident to the imaging element. An integral time for converting an image into the signal charges, is set to be equal to a read-out time T for one line.

As described above, even though the same light irradiates and the same integral time is set, numbers of the read-out electrons may be different from each measuring time. This phenomenon is named as as an optical shot noise and causes the deterioration of a signal to noise ratio.

The signal to noise ratio restricted by this phenomenon may be represented as follows:

$$S/N = (N_{av})^{\frac{1}{2}} / N_{av} = 1/(A \times S \times T \times I)^{\frac{1}{2}}$$

Furthermore, the realization of high-speed and high resolution requires a decrease of both the imaging element area S and the integration time T, thereby reducing the number of electrons occurring under the same quantity of the light. If a light quantity I increases with a reduced amount of the imaging element area S and integration time T, it is possible to keep the same S/N in principle. However, because the light quantity I has a limit to increase in actuality, there is an essential limit of the deterioration of S/N caused by the optical shot noise when the apparatus is modified to be high speed and high resolution.

If it is only an improvement of the S/N caused by the optical shot noise, the same line sensor 3 may scan the same line 5 on the paper 1 at a plurality of times and the read-out data may be averaged for each same imaging element. Namely, the same line is scanned by n times to generate an average signal having an average value $N_{av}$ and the standard deviation $(N_{av})^{\frac{1}{2}}$, thereby improving an $n^{\frac{1}{2}}$ time of an S/N in comparison with a case scanning only one time. However, because the same line should be scanned n times, it takes n times the read-out time for the paper, thereby extremely reducing the high-speed efficiency.

SUMMARY OF THE INVENTION

In view of the above condition, an object of the present invention is to provide a picture image photographing apparatus capable of improving an S/N caused by optical shot noise without degrading a high-speed efficiency.

In order to accomplish the above object, the picture image photographing apparatus of the present invention comprises read-out means for reading in parallel line data of one line on a paper as a plurality of line sensors through an optical system, and signal processing means for obtaining a mean value of a plurality of signals with respect to the same point on the same line and which is read out by using the plurality of the line sensors, and for outputting the mean value as a final data.

By the picture image photographing apparatus according to the present invention and as described above, the line data of one line on the paper are read out by the plurality of line sensors of the read-out means, and the mean value of the plurality of signals with respect to the same point of the same line by means of the signal processing means, thereby outputting the line data which is averaged. Accordingly, it is possible to improve an S/N caused by the optical shot noise without losing a high-speed efficiency.

According to the present invention, there is obtained an improvement of signal-to-noise ratio without loss of high speed.

DETAILED DESCRIPTION OF THE PREFERRED EMBODIMENTS

Figure 3:
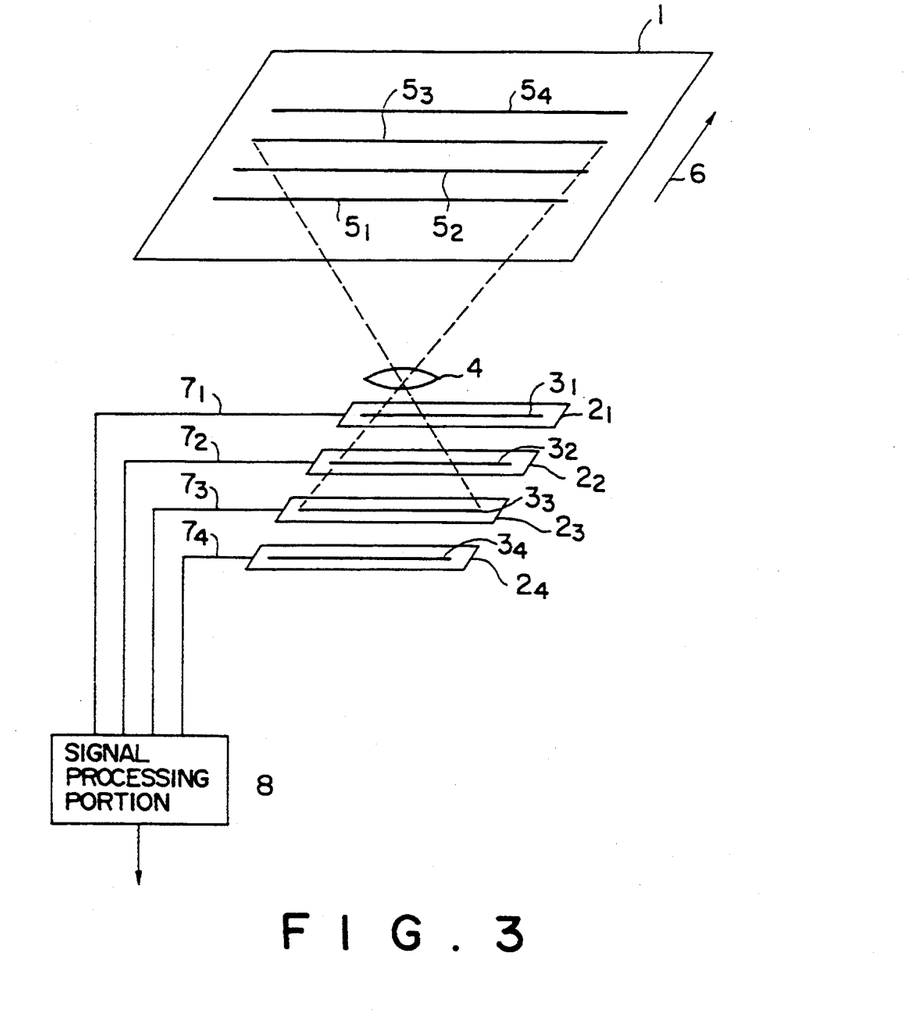
FIG. 3 is a block diagram showing a construction of a picture image photographing apparatus according to a first embodiment of the present invention.

There is shown in FIG. 3 a construction of a picture image photographing apparatus according to a first embodiment of the present invention. The picture image photographing apparatus of the first embodiment comprises an imaging lens 4, a plurality of (four in this embodiment) solid-state imaging devices $2_1$, $2_2$, $2_3$, and $2_4$, and a signal processing portion 8. Each solid-state imaging device $2_i (i=1, \ldots, 4)$ has a line sensor $3_i (1=1, \ldots, 4)$ consisting of a plurality of imaging elements. Each line sensor $3_i$ reads out one by one data of each line $5_j (j=1, \ldots, 4)$ on a paper 1 in accordance with the supply of the paper 1 in the direction of an arrow 6. Namely, data of each line $5_j$ are read out four times by respective line sensors $3_1$, $3_2$, $3_3$ and $3_4$ with the conveyance of the paper 1. A picture image of one line such as line $5_1$ which is read out by the line sensors $3_1$, $3_2$, $3_3$ and $3_4$, is converted into signal charges one by one by the line sensors $3_1$, $3_2$, $3_3$ and $3_4$, and the solid-state imaging device 2 converts the signal charges into a voltage, thereby outputting the voltage through each output line $7_1$, $7_2$, $7_3$ or $7_4$ to the signal processing portion 8. The signal processing portion 8 compensates for discrepancies of lines and obtains an average value of output data from each solid-state imaging device $2_1$, $2_2$, $2_3$ and $2_4$ with respect to one point on the paper 1, thereby outputting the average value to an external device. The signal processor 8 may include a sensitivity compensation of each line if it is necessary.

A picture image of one line on the paper 1 is read out in parallel by a plurality of lines of n (such as four lines in the first embodiment), and data on the same point are divided by n to be averaged, so that an S/N which is caused by the optical shot noise is improved $n^{\frac{1}{2}}$ times.

Furthermore, a time required to read, is equal to the time which is required when the paper increases 2M lines, if the distance between lines of the pixel trains is set to M line on the paper and the sensitivity compensation and averaging operation of the signal processing portion 8 is sufficient to be high speed, so that the processing time does not increase, when compared with the conventional apparatus.

Figure 4:
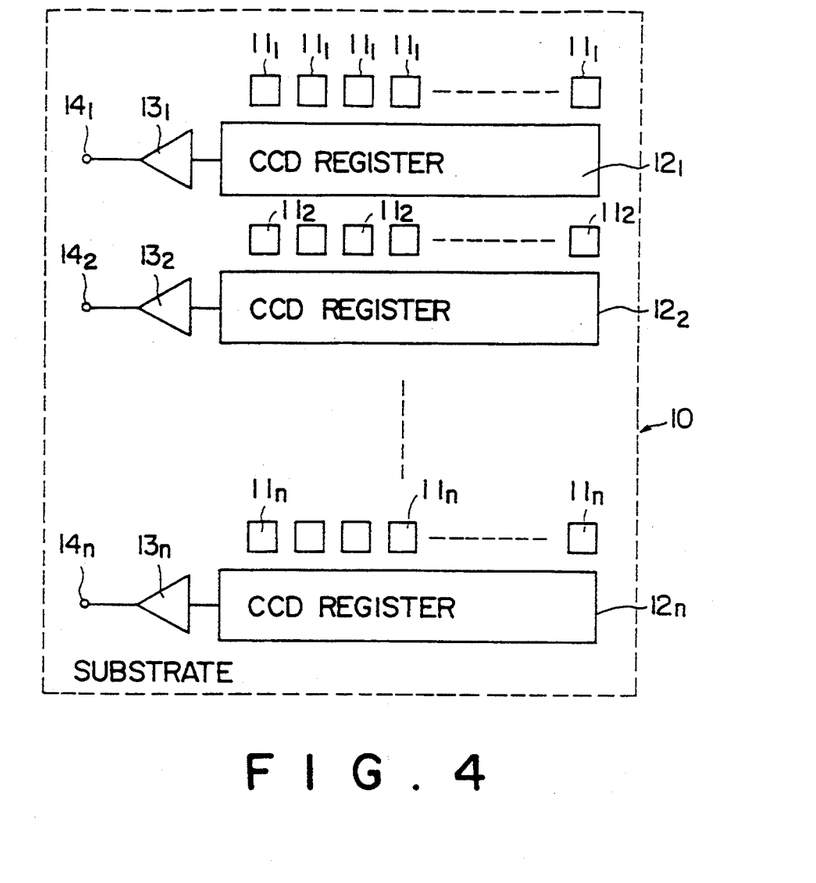
FIG. 4 is a block diagram showing a solid-state imaging device which is used as an input portion of a picture image photographing apparatus according to a second embodiment of the present invention.

Even though the apparatus according to the first embodiment has a plurality of the solid-state imaging devices $2i$ (i=1, 2, 3 and 4) which are separatedly constructed as shown in FIG. 3, the present invention is not limited in this configuration. For example, as shown in a second embodiment of FIG. 4, a plurality of (for example, as n) solid-state devices may be formed on a substrate 10 and used as an input portion of the picture image photographing apparatus. Furthermore, it is needless to say that the circuits having respectively partial functions of the signal processing portion 8 may be integrated onto the same substrate.

In addition, in the first and second embodiments described above, the description was given for the successive reading of the same line on the original by successive scanning of the line sensors when there was temporal delay by a plural number (four) of line sensors. The present invention is not limited to a configuration such as this. For example, the image which is irradiated from the same optical system can be separated into a plural number of optical images and the plural number of line sensors can be respectively arrayed on the extensions of the respective axes of separation.

The following is a description of a third, fourth and fifth embodiments of the present invention and which are specific examples of configurations in which the optical paths of the image irradiated from the optical system are separated. The description will be given with references to FIGS. 5 through 7.

Figure 5:
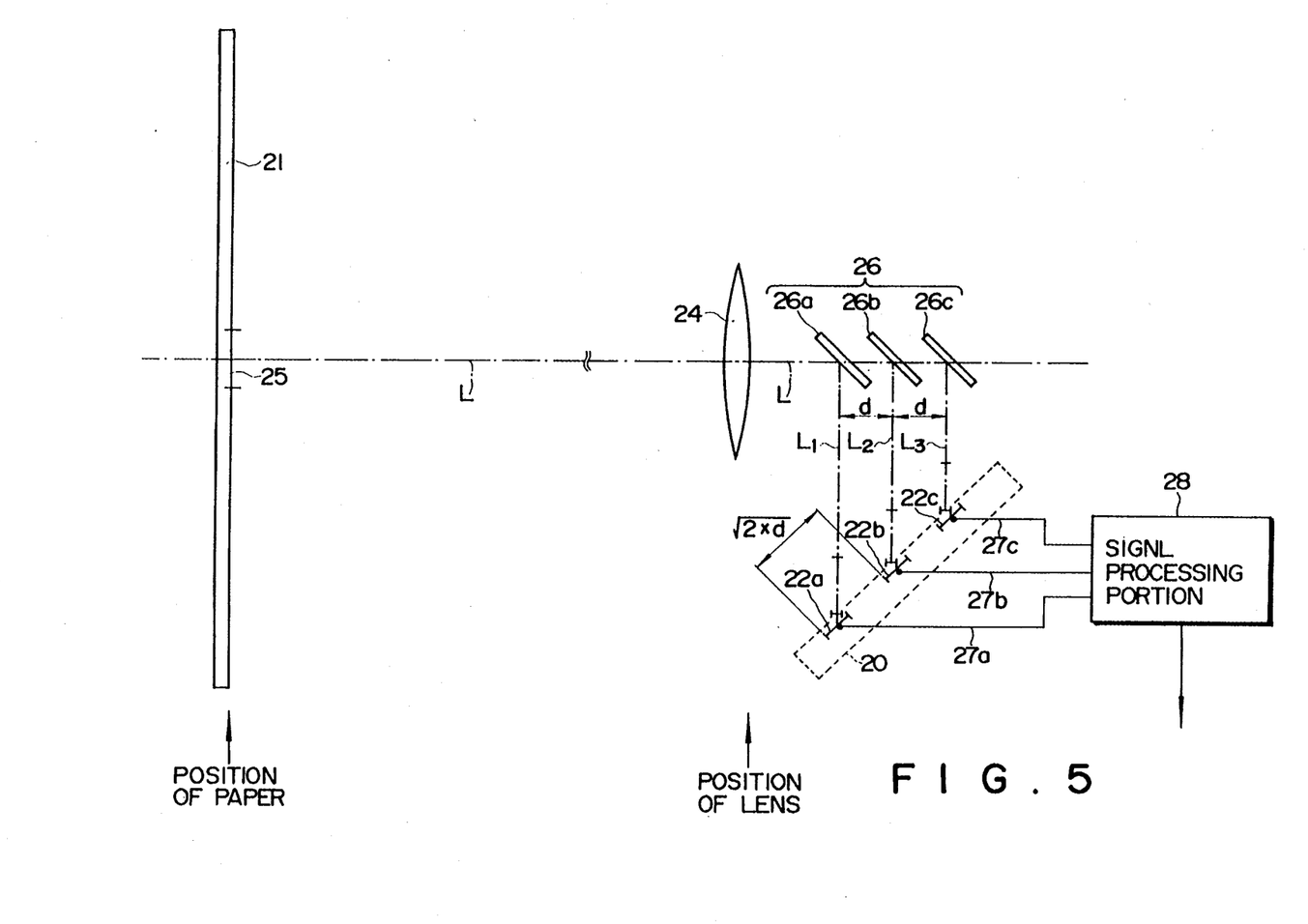
FIG. 5 is a block diagram showing a schematic construction of a picture image photographing apparatus according to a third embodiment of the present invention.

The third embodiment shown in FIG. 5 uses a semi-transparent reflecting mirror as the means for dividing the irradiated light. The optical system of this embodiment is configured from a lens 24 which passes the image light L which is irradiated to it after being reflected by an original paper 21, and a semi-transparent reflecting mirror 26 which is arranged on the side of emission from the lens 24. In the case of this third embodiment, this reflecting mirror 26 is configured from the three half mirror 26a, 26b and 26c which respectively separate the image light L into three separated light L1, L2 and L3. Along the extensions of the separated light L1, L2 and L3 are provided a plural number of line sensors 22a, 22b and 22c which respectively detect the images of the light rays. When the separated light L1, L2 and L3 is detected to be a monochrome image, parallel sensors can be arranged along the image light L so that there is the same length of the optical path but in this third embodiment, there is the use of a color multi-line type sensor as the image read means and so the lengths of the optical paths of the separated light L1, L2 and L3 are set so as to correspond to the wavelengths of colors detected by each of the line sensors 22a, 22b and 22c. Accordingly, the line sensors 22a is the B-line sensor which detects the color of blue which has the shortest wavelength, and the line sensors 22b and 22c are a G-line sensor and R-line sensor which respectively detect the intermediate wavelength of green and longest wavelength of red.

The color line sensor 20 upon which these line sensors 22a, 22b and 22c are mounted is arranged so as to have a required angle of inclination such as 45 degrees for example, with respect to the optical axis of the image light L. Moreover, the description of the arrangement of the imaging elements in each of the line sensors will be given later. Furthermore, if the respective intervals between the half mirrors 26a, 26b and 26c are d, then the respective intervals between each of the line sensors 22a, 22b and 22c is given by the square root of "2×d". In addition, the number 25 shown on the original paper 21 indicates the region of the original paper which has its image formed on each of the line sensors 22a, 22b and 22c of the sensor 20.

The signals which are the result of the photoelectric conversion of light detected by each of the line sensors 22a, 22b and 22c are supplied to the signal processing portion 28 via signal lines 27a, 27b and 27c. The operation of the processing which is performed by this signal processing portion 28 is the same as that which was described for the first and second embodiments and so a detailed description will be omitted here.

Figure 6:
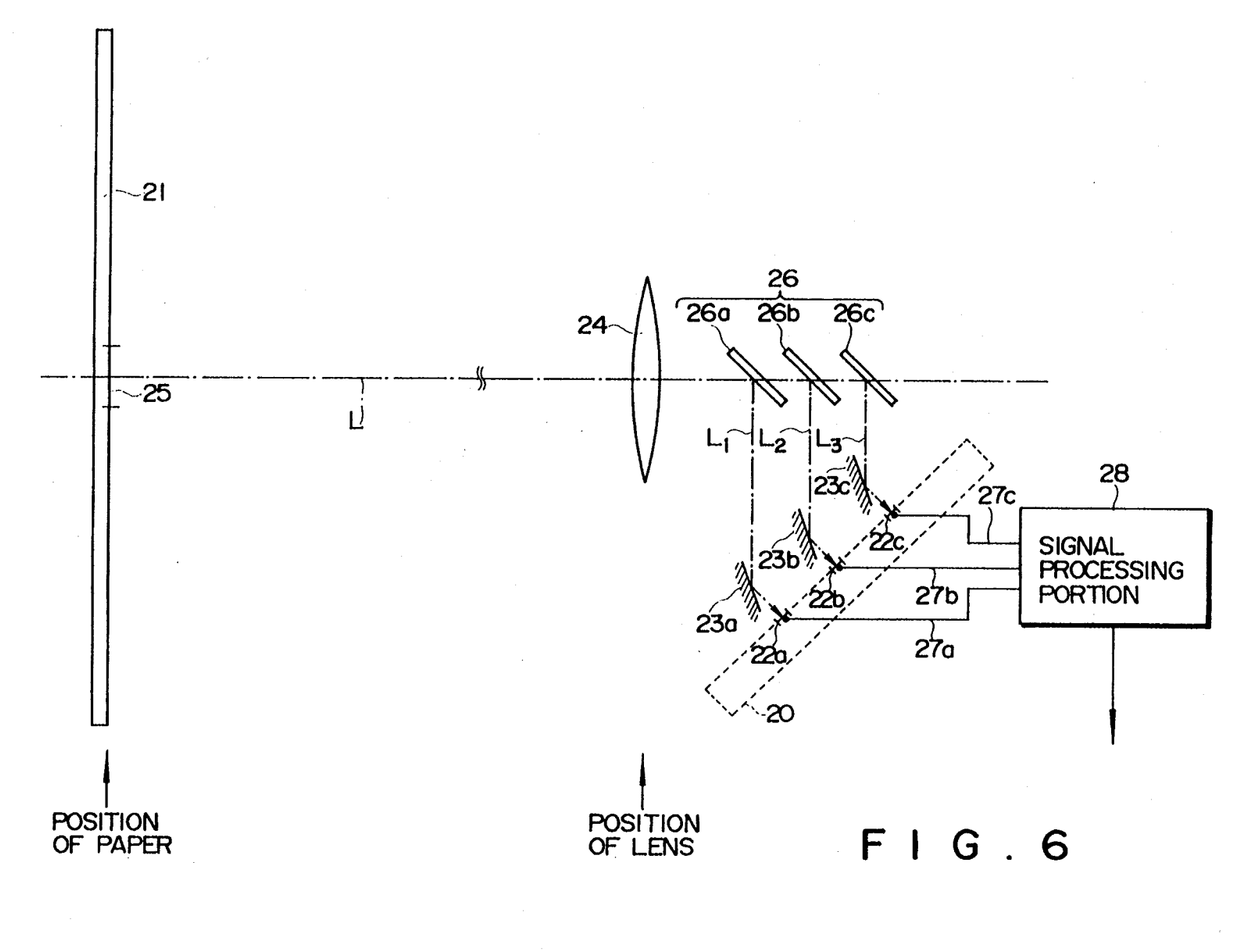
FIG. 6 is a block diagram showing a schematic construction of a picture image photographing apparatus according to a fourth embodiment of the present invention.

In passing, the picture image photographing apparatus according to a third embodiment has the line sensor 20 arranged at an angle of inclination of approximately 45 degrees with respect to the optical axis of the image light L and so there is the problem that the amount of light of the separated light L1, L2 and L3 which is irradiated to each of the line sensors 22a, 22b and 22c is reduced. The fourth embodiment shown in FIG. 6 is proposed in order to solve this problem. In FIG. 6, the mirrors 23a, 23b and 23c are respectively provided on the optical paths of the separated light L1, L2 and L3 in order to change those optical paths, and the presence of these mirrors causes the optical axis of the separated light L1, L2 and L3 to move at an angle of approximately 135 degrees. Accordingly, the separated light from the direction of intersection of light receiving surfaces of the sensor 20 is supplied to each of the pixel trains 22a, 22b and 22c. The picture image photographing apparatus according to the fourth embodiment has the same effect as the apparatus according to the third embodiment but the separated light supplied to the each of the line sensors 22a, 22b and 22c is irradiated in the direction perpendicular with respect to each of the imaging elements and so there is the added effect of being able to prevent dilution of the light amount.

Figure 7:
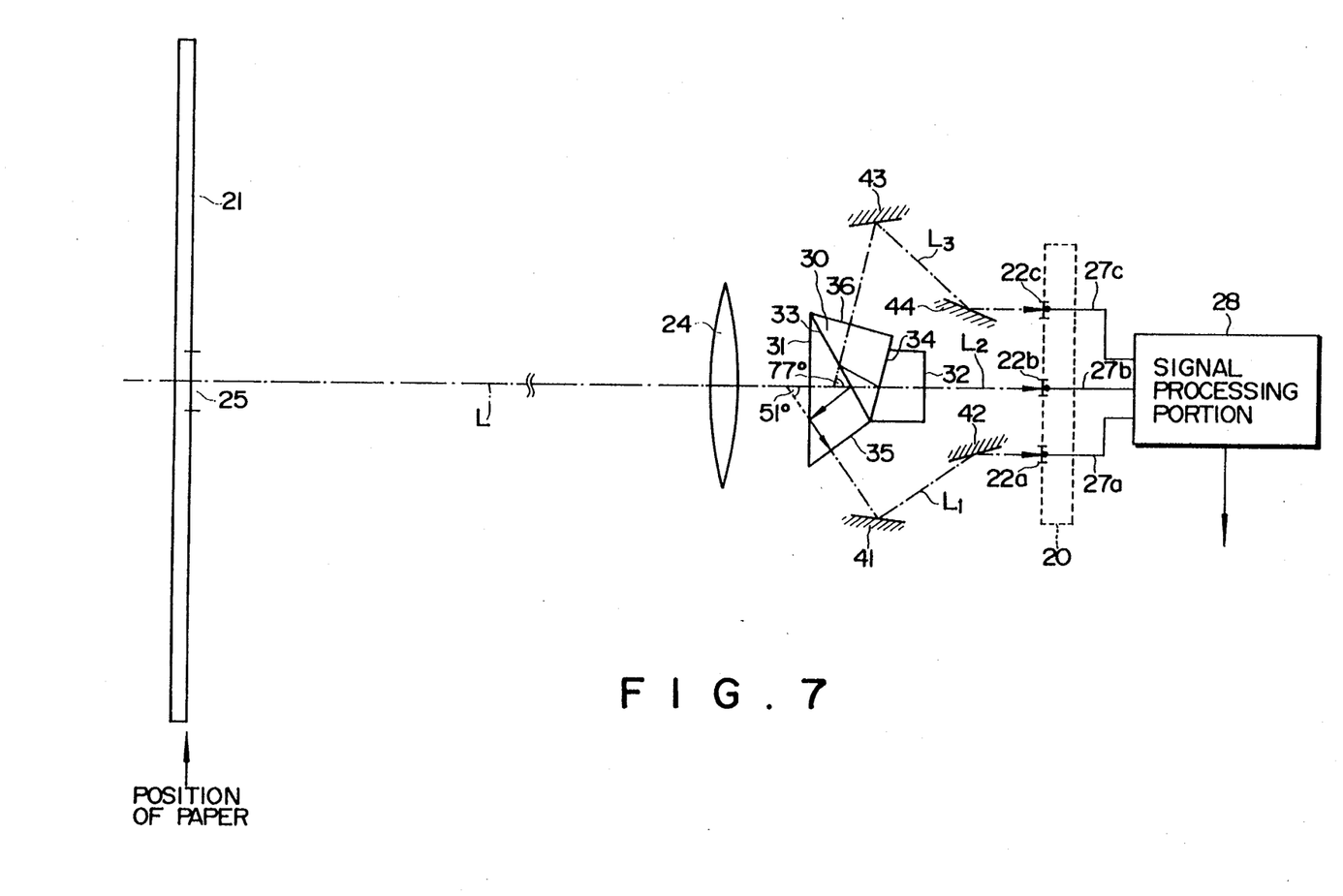
FIG. 7 is a block diagram showing a schematic construction of a picture image photographing apparatus according to a fifth embodiment of the present invention.

Moreover, in the third and fourth embodiments described above, the description was given for when a semi-transparent reflecting mirror was used as the irradiated light separation means but the present invention is not limited to this, as for example, a dichroic prism or the like can be used as the light separation means. The following is a description of the fifth embodiment of the present invention wherein a dichroic prism is used as the irradiated light separation means. This description will be given with reference to FIG. 7. In FIG. 7, a dichroic prism 30 is provided to the side of emission of the image light L. The dichroic prism 30 has an irradiation surface 31 to which all light of the three colors of blue, green and red is irradiated, a first emission surface 32 from which is emitted green color light, a first dichroic layer 33 which reflects blue color light, a second dichroic layer 34 which reflects red color light, a second emission surface 35 from which is emitted blue color light, and a third emission surface 36 from which is emitted red color light. In addition, a first and second reflecting mirrors 41 and 42 for reflecting the separated light of blue color, and a third and fourth reflecting mirrors 43 and 44 for reflecting the separated light of red color are respectively provided on the side of the emitted light. In such a basic configuration, the three colors are irradiated from the irradiation surface 31 to inside the prism 30, and the green light is emitted as it is from the first emission surface 32 and as it is to be supplied to the line sensors 22b of the sensor 20 and which corresponds to green. The blue color light is reflected by the first dichroic layer 33 and is then reflected again by the rear side of the irradiation surface 31 and is emitted from the second emission surface 35, reflected again by the first and second mirrors 41 and 42 and is supplied to the line sensors 22a. The red color light is reflected by the second dichroic layer 34 and is then reflected again by the rear side of the first dichroic layer 33 and is emitted from the third emission surface 36, reflected again by the third and fourth mirrors 43 and 44 and is supplied to the line sensors 22c. The separated light L1, L2 and L3 of each of the colors irradiated to the line sensor, 20 undergoes photoelectric conversion in each of the imaging elements to the signal processing portion 28 via the signal lines 27a, 27b and 27c, and the read of the information is performed by processing which is the same as that described above for the third and fourth embodiments.

Moreover, in the third through fifth embodiments described above, the description was given for when light of the three colors of blue, green and red was used for the processing by the color multi-line sensor 20 but the present invention is not limited to this as the three complementary colors of cyan, magenta and yellow can be used.

In addition, the description was given for the case when each of the line sensors 22a, 22b and 22c were configured from three types of imaging elements corresponding to three color hues and having respectively different color separation characteristics, were arranged with a required regularity. The following further describes with respect to this required regularity.

More specifically, the color line sensors 22a, 22b and 22 can be configured so that the three different types of imaging elements inside one line sensor can be arranged with successive repetitions of R, G and B, and which is plural number such as three, of these line sensors being arranged in parallel.

In addition, as in the case of the third through fifth embodiments, the line sensors 22a, 22b and 22c can be configured from imaging elements of a color hue and having the same light separation characteristics. Furthermore, the number of line sensors can be a triple number of successive repetition of the three imaging elements of R, G and B, for example. More specifically, the color pixel train can be configured from line sensor groups configured as groups having a plural number of line sensors of color hues having the same light separation, characteristics, and these color line sensor groups can be arranged in three to configure the sensor.

One example of such a color line sensor is configured by two of the three types of line sensors, such as R and G, having a regularity and being arranged in successive lines, and the line sensor adjacent to these being configured only from the remaining one of the three types of line sensors, such as B, and being arranged so that the other two types of color line sensor being arranged so as to have a required regularity. In this case, when the irradiated light separation means is configured by a dichroic prism, it is possible to simplify the configuration of the means for dividing the light emitted from the lens.

What is claimed is:

1. A picture image photographing apparatus, comprising:
    read out means, including a plurality of line sensors, for simultaneously reading out data from said plurality of line sensors and for generating a plurality of output signals;
    an optical system for irradiating optical information on an original paper and for focusing a specific line of information on said original paper onto each of said plurality of line sensors, at least one specific point in said specific line being focused on a corresponding imaging element in each of said plurality of line sensors; and
    signal processor means connected to receive said plurality of output signals for calculating a mean value of said plurality of output signals with respect to said at least one specific point in said specific line of information on said original paper.

2. The picture image photographing apparatus according to claim 1, wherein
said read-out means comprises n (n is a natural number, solid-state imaging device respectively having one of said plurality of line sensors, and each of said solid-state imaging devices performs a photoelectric conversion of an optical image of said specific line incident on said corresponding line sensor so as to generate signal charges, converts said signal charges into data signals having a predetermined voltage, and supplies said data signals through an output line to said signal processing means.

3. The picture image photographing apparatus according to claim 2, wherein said signal processing means sequentially inputs n data signals of each line which are supplied from said n solid-state imaging device through n output lines, compensates line discrepancies with respect to said n data signals, and externally outputs said mean value which is obtained from data of said at least one specific point on said paper on the basis of said n data signals.

4. The picture image photographing apparatus according to claim 3, wherein
said signal processing means has a sensitivity compensating portion for compensating a sensitivity of said n signals inputted through said output lines.

5. The picture image photographing apparatus according to claim 2, wherein
each of said solid-state imaging devices comprises one of said plurality of line sensors to which images are inputted through a lens system, a photoelectric converting portion for converting optical data imaged on said one line sensor to signal charges, and an output portion for outputting data information which are converted from said signal charges and have a predetermined voltage, and
each of said n solid-state imaging devices is separately comprised of a discrete circuit.

6. The picture image photographing apparatus according to claim 2, wherein
each of said solid-state imaging devices comprises one of said plurality of line sensors to which images are inputted through a lens optical data imaged on said line sensor to signal charges, and an output portion for outputting data information which are converted from said signal charges and have a predetermined voltage, and
said n solid-state imaging devices is formed by integrating on a substrate.

7. The picture image photographing apparatus according to claim 6, wherein
both of said signal processing means and said output lines for supplying said data signals to said signal processing means, are integrated on said substrate with said n solid-state imaging devices.

8. The picture image photographing apparatus according to claim 1 wherein
said optical system is configured from a lens which irradiates optical information, and an optical path separation means which separates light rays which pass through said lens provided on an emission side of said lens and changes an optical path of said light rays; and
said plurality of line sensors are of a plurality of different types having respectively different light sensitivities, and are provided to use a plurality of items of optical information separated by said optical path separation means on a basis of said types to take a plurality of pieces of recording information of a same region on an original paper.

9. The picture image photographing apparatus according to claim 8, wherein
said optical path separation means is configured from a plurality of semi-transparent reflecting mirrors of a number equal to a number of said different types of said plurality of line sensors, successively arranged on an optical axis of light of said lens and reflected with respect to an original paper.

10. The picture image photographing apparatus according to claim 9, wherein
said semi-transparent reflecting means is configured from three half mirrors successively arranged on said optical axis to form three optical paths; and
said plurality of line sensors comprises three line sensors provided with three types of imaging elements having three types of light separation sensitivities and arranged at different distances from said mirrors and correspond to a wavelength of light of each color, respective optical path lengths of said three optical paths from an optical axis by said half mirrors to said three line sensors are of different lengths.

11. The picture image photographing apparatus according to claim 10, wherein
along said three optical paths leading to the three said line sensors from said three half mirrors is provided a reflecting mirror to change an optical path so that said optical path becomes perpendicular with respect to said line sensors.

12. The picture image photographing apparatus according to claim 8, wherein
said optical path separation means is provided on an optical axis of light of said lens and reflected with respect to an original paper, and is configured from a prism which splits light of an optical image into a plurality of color wavelengths each corresponding to a color detected by said line sensors.

13. The picture image photographing apparatus according to claim 1, wherein
said plurality of line sensors comprises a color line sensor unit which is configured from three different types of color line sensors corresponding to three color hues and having respectively different light separation characteristics, and arranged with a required regularity.

14. The picture image photographing apparatus according to claim 13, wherein
each of said plurality of line sensors in said color line sensor unit is configured from three different types of imaging elements being successively arranged, said line sensors being arranged in parallel in a plural number of lines.

15. The picture image photographing apparatus according to claim 13, wherein
said color line sensor unit is formed from color line sensors having imaging elements of color hues having the same light separation characteristics, and color line sensors of three types of color hues are arranged with an overall regularity.

16. The picture image photographing apparatus according to claim 15, wherein
said color line sensor unit includes a plurality of color line sensors in which three adjacent color line sensors being respectively configured from different types and having mutually different light separation characteristics, having a regularity which is repeated.

17. The picture image photographing apparatus according to claim 15, wherein said color line sensor unit is configured from line sensor groups configured from a plurality of line sensors of a color hue and having a same light separation characteristics and forming one group, said color line sensor group being arranged in three trains to form said read-out means.

18. The picture image photographing apparatus according to claim 13, wherein a first line sensor is configured as successively arranged line sensors of two of said three types of color line sensors having regularity, and adjacent line sensors are configured from a remaining one type of said three types of color line sensors and is arranged with a required regularity to configure said read-out means.

19. An image photographing apparatus comprising:

an optical separator receiving a light beam representing a line of image information contained on an original paper and separating said light beam into a plurality of light beams, each of said plurality of light beams representing said line of image information;

a solid state image device including a plurality of line sensors, each of said line sensors receiving image information from a corresponding one of said plurality of light beams, said solid state image device outputting a plurality of signals, each of said signals corresponding to one of said plurality of line sensors; and a processor connected to receive said plurality of signals, said processor calculating a mean value of said plurality of signals and outputting a signal representing said mean value.

20. A method of improving a signal to noise ratio in a photographing apparatus, comprising the steps of:

irradiating optical information on an original paper via a light source;

directing a light beam representing a specific line of image information on said original paper to an optical separator;

separating said light beam into a plurality of light beams via said optical separator, each of said plurality of light beams representing said specific line of image information;

impinging each of said plurality of light beams onto one of a corresponding plurality of line sensors within a solid state imaging device;

converting each of said plurality of light beams into a data signal, each of said data signals representing a plurality of image points on said specific line of image information; and calculating an average value for each of said image points using a plurality of values for a same image point from each of said data signals.

* * * * *